US005545824A

United States Patent [19]
Stengel et al.

[11] Patent Number: 5,545,824
[45] Date of Patent: Aug. 13, 1996

[54] CURING COMPOSITION FOR ACRYLIC POLYOL COATINGS AND COATING PRODUCED THEREFROM

[75] Inventors: Sandra R. Stengel, Brunswick; George Eisenmann, Strongsville; Sharon M. Friedrich, Cleveland, all of Ohio

[73] Assignee: PPG Industries, Inc., Pittsburgh, Pa.

[21] Appl. No.: 504,460

[22] Filed: Jul. 20, 1995

Related U.S. Application Data

[63] Continuation of Ser. No. 150,943, Nov. 12, 1993, abandoned, which is a continuation of Ser. No. 122,075, Sep. 14, 1993, abandoned.

[51] Int. Cl.⁶ .......................... C08J 3/00; C08K 3/20; C08L 75/00; C08F 8/30
[52] U.S. Cl. .......................... 524/590; 524/589; 525/123; 525/127; 525/455; 528/44; 528/67; 528/73
[58] Field of Search .................... 524/589, 590; 525/123, 127, 455; 528/67, 73, 44

[56] References Cited

U.S. PATENT DOCUMENTS

| | | | |
|---|---|---|---|
| 3,992,316 | 11/1976 | Pedain et al. | 528/67 |
| 4,038,304 | 7/1977 | Kazama et al. | 528/67 |
| 4,395,528 | 7/1983 | Lenier et al. | 528/45 |
| 4,485,228 | 11/1984 | Chang et al. | 528/84 |
| 4,692,382 | 9/1987 | Schmitt et al. | 428/414 |
| 4,822,685 | 4/1989 | Perez et al. | 428/423.3 |
| 4,891,248 | 1/1990 | Kraus | 427/340 |
| 4,944,803 | 7/1990 | Kraus | 106/203 |
| 5,137,972 | 8/1992 | Cook | 525/123 |
| 5,154,950 | 10/1992 | Rosthauser et al. | 427/340 |
| 5,227,201 | 7/1993 | Harper | 427/407.1 |
| 5,279,862 | 1/1994 | Corcoran et al. | 427/407.1 |

*Primary Examiner*—Paul R. Michl
*Assistant Examiner*—Patrick Niland
*Attorney, Agent, or Firm*—Linda Pingitore; Dennis G. Millman

[57] ABSTRACT

A curing composition, for use in curing of an acrylic polyol-containing coating composition, contains from about 20 to about 70 percent of an aliphatic polyisocyanate, from about 20 to about 70 percent of an aliphatic polyisocyanate prepolymer, from about 0.01 to about 5.0 percent of an ultraviolet light stabilizer, and from about 0.25 to about 5.0 percent, based on the weight of the solids of the curing composition of a metal catalyst, and from about 20 to about 70 percent of an organic diluent, based on the total weight of resin and diluent of the curing composition. The curing composition provides a fast cure for the coating composition while having a sufficient gel time to allow practical application thereof the a basecoat.

14 Claims, No Drawings

5,545,824

CURING COMPOSITION FOR ACRYLIC POLYOL COATINGS AND COATING PRODUCED THEREFROM

CROSS REFERENCE TO RELATED APPLICATIONS

This application is a file wrapper continuation of application Ser. No. 80/150,943, filed Nov. 12, 1993 now abandoned, which is a continuation of Ser. No. 08/122,075 filed Sep. 14, 1993, now abandoned entitled Curing Composition For Acrylic Polyol Coatings And Coating Produced Therefrom.

BACKGROUND OF THE INVENTION

The present invention relates to a curing composition for the fast curing of coating compositions containing acrylic polyols.

In the coating of automobiles, for example, a coating is desired that provides a lustrous appearance and has good corrosion resistance. Such coatings are usually applied in several coating layers with typically a pigmented base coating composition applied followed by a clear topcoat. In some instances, the topcoat may contain pigments which provide a color to the topcoat, or a single pigmented coating composition may be used. Acrylic polyol based coating compositions are particularly useful for these applications. Especially desirable are acrylic polyol based clear coating compositions which can be used as "universal" clear coats over a variety of basecoats to provide a hard, durable finish.

Although such acrylic polyol based coating compositions have excellent properties as automotive coatings, both on metal and plastic substrates, the length of time required for curing can be a drawback. The curing time for such coatings is labor sensitive and a fast cure of the coating is preferred, while at the same time maintaining a useful gel time, i.e. the coating composition should not gel when being used until sufficient time has lapsed for spraying or otherwise applying the coating composition. Typically, a gel time of about one hour is desired to allow sufficient time for application.

Accordingly, acrylic polyol based coating compositions are desirable that will provide not only a suitable gel time but also a rapid cure.

SUMMARY OF THE INVENTION

The curing composition of the present invention, for use in fast curing of a coating composition containing an acrylic polyol, is composed of from about 20 to about 70 percent by weight of an aliphatic polyisocyanate, from about 20 to about 70 percent by weight of an aliphatic isocyanate prepolymer, from about 0.01 to about 5.0 percent by weight of an ultraviolet light stabilizer, from about 0.1 to about 5.0 percent by weight of the solids content of the coating composition of a metal catalyst, and from about 20 to about 70 percent by weight of a liquid diluent. The curing composition is maintained separate from the acrylic polyol and only added thereto at the time of desired curing of the coating composition.

The present invention also provides a two package coating composition for a substrate, such as an automobile which comprises a first package containing an acrylic polyol and as a second package, a curing composition as described above.

Also, the present invention provides a method of providing a cured coating composition on a substrate, such as an automobile, by applying a pigmented base coating composition to the substrate and then applying, before cure of the base coating composition, a two-package acrylic polyol based clear coating composition as described above.

DETAILED DESCRIPTION

The coating composition of the present invention comprises as a film-forming polymer an acrylic polyol, and usually a diluent including volatile solvents and reactive diluents well known in the art. Such acrylic based coating compositions are particularly useful for automotive finishes, especially as clear top coats over a base coat. The clear coatings are very advantageous as "universal" clear coats over a variety of base coats.

Among the acrylic polymers are interpolymers of about 0.2 to about 30 percent by weight hydroxy-containing vinyl monomers such as hydroxyalkyl acrylate and methacrylate having 2 to 6 carbon atoms in the alkyl group and from about 70 to about 99.8 percent by weight of other ethylenically unsaturated copolymerizable materials such as alkyl acrylates and methacrylates; the percentages by weight being based on the total weight of the monomeric charge.

Examples of suitable hydroxyalkyl acrylates and methacrylates are acrylic acid and methacrylic acid esters of ethylene glycol and propylene glycol. Also useful are hydroxy-containing esters and/or amides of unsaturated acids such as maleic acid, fumaric acid, itaconic acid and the like.

Examples of suitable alkyl acrylates and methacrylates are lauryl methacrylate, 2-ethylhexyl methacrylate and n-butyl acrylate.

Besides the acrylates and methacrylates, other copolymerizable monomers which can be copolymerized with the hydroxyalkyl acrylates and methacrylates are ethylenically unsaturated materials such as monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, triallyl cyanurate and mixtures thereof. Usually these other ethylenically unsaturated materials are used in admixture with the above-mentioned acrylates and methacrylates.

Besides the film-forming acrylic polyols, other adjuvant resins such as polyesters can also be added to the formulation of the composition of the present invention. Usually, these polyesters are polyester polyols which are designed to be cured with a polyisocyanate. The polyesters are formed by the polyesterification of an organic polycarboxylic acid or its functional equivalent thereof with an organic polyol. Among the acids which can be used are phthalic acid, terephthalic acid, tetrahydrophthalic acid, hexa-hydrophthalic acid, azelaic acid and dimerized fatty acid including mixtures. Examples of suitable polyols are ethylene glycol, 1,4-butanediol, neopentyl glycol, trimethylpentanediol and trimethylolpropane including mixtures. Also, polycaprolactone-type polyesters may be employed which are formed from reaction of a cyclic lactone such a epsilon-caprolactone with a polyol or a hydroxy acid such as ethylene glycol and dimethylolpropionic acid.

The metal catalysts used in the present invention are metal catalysts for facilitating the cure of polymer based compositions containing hydroxyl and isocyanate groups. Preferably, the metal catalysts are formed from tin, cobalt, calcium and cesium, and most preferably, from tin. Such metal catalysts are known in the art for accelerating the reaction of hydroxyl-containing organic molecules with isocyanates (i.e. polyisocyanate-polyol compositions) to form urethane groups. Representative of such catalysts are metal salts of carboxylic acids, diorganometallic oxides, mono- and diorganometallic carboxylates, and the like. Specific examples of such metal catalysts are calcium naphthanate, cesium naphthanate, cobalt naphthanate, dibutyl tin dilaurate, dibutyl tin diacetate, dibutyl tin octoate and dibutyl tin naphthanate.

Although such catalysts have previously been used in curing polyisocyanate-polyol compositions, they have normally been used in or about an amount of between 0.06 to 0.10 percent by weight of the solids content of such compositions. In the present invention, the amount of metal catalyst should be between about 0.25 to 5.0 percent and preferably between about 0.5 to 2.0 percent, the percentages based on the total weight of the solids of the curing compositions.

In the practice of the invention, the film forming acrylic polyol is used in combination with a polyisocyanate curing agent which is capable of reacting with the active hydrogens in the acrylic polyol to give a thermosetting coating. The composition is typically a two package composition with the polyisocyanate in one package and the polyol in a separate package, the two packages being mixed just prior to application.

Examples of the polyisocyanate used in the curing composition are monomeric aliphatic isocyanates such as 4,4'-methylene-bis-(cyclohexyl isocyanate), isophorone diisocyanate and NCO-prepolymers such as the reaction products of monomeric polyisocyanate such as those mentioned above with polyester or polyether polyols. Particularly useful polyisocyanates are the isocyanurate from isophorone isocyanate commercially available from Hüls America as T1890 and the biuret from 1,6-hexamethylene diisocyanate commercially available from Miles, Inc. as DESMODUR N 3300, a triisocyanurate also available from Miles, Inc.

In addition to the aliphatic polyisocyanate present in the curing composition, there is also present an aliphatic polyisocyanate prepolymer. These prepolymers are formed by reacting an excess of previously described polyisocyanates, preferably monomeric aliphatic diisocyanates, with low molecular weight isocyanate reactive compounds which generally have a formula molecular weight ranging from about 100 to about 1000. Compounds with higher or lower molecular weights can also be used as well as oligomeric and polymeric materials. Examples of suitable low molecular weight isocyanate reactive compounds include neopentyl glycol and trimethylol propane. Prepolymers prepared exclusively from polyisocyanates and low molecular weight isocyanate-reactive compounds are referred to as polyisocyanate adducts containing urea and/or urethane groups. A sufficient excess of the polyisocyanate should be used to ensure that the prepolymers are terminated with isocyanate groups. Generally the equivalent ratio of NCO to OH group should range from about 3:1 to about 1.2:1. It should also be ensured that the isocyanate-terminated prepolymers remain soluble in the commonly used polyurethane solvents and do not gel. When isocyanate-terminated prepolymers are prepared from polyisocyanates and isocyanate-reactive compounds containing more than two reactive groups, branching generally occurs which can lead to gelation. Minimal amounts of branching do not lead to gelation; however, once a sufficient cross-link density is achieved from excessive branching, gelation occurs. The critical cross-link density, commonly referred to as the gel point, may be calculated by known methods or readily determined by simply reacting the desired components in a suitable vessel and observing the time required for gel particles to form, that is, the time until the composition resulting from the reacted components no longer flows. In order to avoid gelation, it is preferred to prepare the isocyanate-terminated prepolymers from monomeric-aliphatic diisocyanates rather than from higher functional polyisocyanates. It is additionally preferred to prepare the isocyanate-terminated prepolymers from low molecular weight isocyanate-reactive compounds which do not contain excessive amounts of branching in order to further reduce the possibility that gelation will occur. Finally, it is preferred to prepare the isocyanate-terminated prepolymers by adding the isocyanate-reactive compound to the polyisocyanate since this helps to maintain an excess of isocyanate groups throughout the formation of the prepolymer. Such prepolymers and processes for their production are known in the art.

The amounts of acrylic polyol and polyisocyanate curing agent which are used in the practice of the invention are preferably adjusted so that the equivalent ratio of hydroxyl groups from the acrylic polyol to isocyanate groups from the curing agent is within the range of from about 0.8 to about 1.5:1, preferably 1.1:1. Isocyanate to hydroxyl equivalent ratios greater than this ratio are not preferred because hardness and durability of the resultant coating will suffer; whereas ratios lower than this ratio are not preferred because flexibility of the resultant coating will suffer.

The above-described resinous components can be formulated into clear coating compositions which are preferred or, alternately, they can be formulated with pigments to form pigmented coating compositions. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the paint is usually expressed as the pigment-to-resin weight ratio. In the practice of the invention, when the film-forming coating compositions of the present invention contain a pigment, the pigment-to-resin weight ratios may be as high as 2:1 and for most pigmented coatings are within the range of 0.05 to 1:1.

Also present in the claimed curing compositions is an ultra-violet light stabilizer in an amount from between about 0.01 to about 5.0 percent by weight, and preferably in an amount of about 1.5 to about 2.5 percent by weight, the percentages based on the total weight of solids of the curing composition. A variety of ultraviolet light stabilizers well known to those skilled in the art can be used. Especially useful are the UV absorbers sold as TINUVIN® by Ciba-Geigy Company.

An organic liquid diluent is present in the claimed curing compositions in an amount of between about 20 to about 70 percent by weight. By liquid diluent is meant a volatile solvent or non-solvent which is removed after the coating is applied and reduces viscosity sufficiently to enable forces available in simple coating techniques, namely, spraying, to spread the coating to controllable, desired and uniform thicknesses. Also, diluents assist in substrate wetting, resinous component compatibility, package stability and coalescence or film formation. Examples of suitable diluents include aromatic hydrocarbons such as toluene and xylene, ketones such as methyl ethyl ketone and methyl isobutyl ketone. The diluent is present in amounts up to 70 percent by weight, usually 30 to 55 percent by weight, based on total weight of diluent and resin solids of the curing composition.

The acrylic polyol based coating compositions of the present invention cure rapidly ("fast cure") with tack free times ranging from about 30 minutes to about 90 minutes and dust free times from about 5 minutes to about 40 minutes. The cured films are exceptionally smooth as well as flexible, hard and durable. The claimed coating compositions are particularly useful as "universal clearcoats" for application over a variety of pigmented basecoats, both thermoplastic and thermosetting. Because of their fast cure, they are especially useful in automotive refinish applications and in particular fleet refinish applications.

In the claimed method of coating a substrate, such as steel or plastic automobile sections, a pigmented basecoating composition is applied to the substrate and, while still wet, a two package clear coating composition of the present invention is applied over the basecoat. A wide variety of art recognized basecoating compositions can be used, both thermoplastic and thermosetting. Preferably, the basecoat is also acrylic polyol based. The compositions are then allowed to cure, preferably under ambient conditions, although force drying at elevated temperatures up to 100° C can be used. Typically the compositions are completely cured at about 15° C. to about 35° C.

EXAMPLE I

This example illustrates the preparation and use of a curing composition (Hardener A) according to the present invention as compared to conventional hardeners:

| Component | Parts by Weight (grams) |
|---|---|
| VM & P Naptha[a] (solvent) | 7.9 |
| Toluene (solvent) | 12.6 |
| Butyl Acetate (solvent) | 10.9 |
| T1890E[b] (aliphatic polyisocyanate) | 26.0 |
| P25-A460[c] (aliphatic isocyanate prepolymer) | 41.5 |
| TINUVIN 123[d] (uv light stabilizer) | 0.9 |
| Dibutyl tin dilaurate (catalyst) | 0.2 |

[a]Solvent available from Shell Chemical, Co.
[b]Polyisocyanate, isocyanurate of isophorone diisocyanate (70% solids in butyl acetate), available from Hüls America.
[c]Aliphatic isocyanate prepolymer, an aliphatic urethane prepolymer in butyl acetate solvent, available from Reichold Chemicals Inc.
[d]Light stabilizer available from Ciba-Geigy.

A conventional hardener was prepared and designated as hardener B, having the following components:

| Component | Parts by Weight (grams) |
|---|---|
| Butyl Acetate (solvent) | 33.6 |
| Des N 3390[e] (polyisocyanate) | 35.1 |
| T1890L[f] (polyisocyanate) | 31.3 |

[e]Polyisocyanate, isocyanurate of hexamethylene diisocyanate, available from Miles Inc.
[f]Polyisocyanate, isocyanurate of isophorone diisocyanate (70% solids in butyl acetate/solvesso 100; 1:2), available from Hüls America.

A further conventional hardener was prepared and designated as Hardener C, having the following composition:

| Component | Parts by Weight (grams) |
|---|---|
| Methyl Amyl Ketone (solvent) | 31.8 |
| Des N 3390 (polyisocyanate) | 36.0 |
| T1890L (polyisocyanate) | 32.2 |

Seven sample compositions of clear coat compositions containing the above hardeners were prepared as follows:

Sample 1

Package 1 contained 198 grams of DCD35[g] and Package 2 contained 99 grams of Hardener C.

[g] DELTA™ Clear coating composition available from PPG Industries, Inc., the coating containing an acrylic resin of a weight average molecular weight (Mw as determined by gel permeation chromatography, GPC, using a polystyrene standard) of 10,000–12,000 and a hydroxyl no. of 70–90, an acrylic resin of a molecular weight (Mw) of 4000–5000 and a hydroxyl no. of 70–90, an acrylic resin from S. C. Johnson (JONCRYL 500), diluents, and 0.082, based on the weight of the solids, of dibutyl tin dilaurate.

Sample 2

Package 1 contained 800 grams of DCD35, package 2 contained 412 grams of Hardener C, and Package 3 contained 189.5 grams of a solution of dibutyl tin dilaurate in toluene (1.92 percent by weight).

Sample 3

Package 1 contained 149.5 grams of DCD35, Package 2 contained 62.7 grams of DT870[h] as a solvent, and Package 3 contained 145.3 grams of Hardener A. [h] Normal temperature reducer available from PPG Industries, Inc.

Sample 14

Package 1 contained 200 milliliters of DCU2001[i], Package 2 contained 100 milliliters of DT870 as a solvent, and Package 3 contained 100 milliliters of Hardener B. [i] CONCEPT™2001 Clear available from PPG Industries, Inc., the coating containing an acrylic resin of weight average molecular weight of 10,000–12,000 (Mw) and a hydroxyl no. of 70–90, diluents, and 0.05% based on the weight of the solids of dibutyl tin dilaurate.

Sample 5

Package 1 contained 100 milliliters of DCU2001, package 2 contained 50 milliliters of DT870 as a solvent, and Package 3 contained 100 milliliters of Hardener A.

Sample 6

Package 1 contained 200 milliliters of DMC921[j], Package 2 contained 100 milliliters of DT870 as a solvent, and Package 3 contained 100 milliliters of Hardener B.

[j] Jet Black mixing base color available from PPG Industries, Inc. (DCU 2020 containing an acrylic resin of molecular weight of 10,000–12,000 (Mw) and a hydroxyl no. of 70–90, diluents, and 0.02 based on the weight of solids of dibutyl tin dilaurate).

Sample 7

Package 1 contained 200 milliliters of DMC921, 100 milliliters of DT870 as a solvent, and 200 milliliters of Hardener A.

Five APR23541 panels (obtained from Advanced Coating Technologies, Inc. as ACT cold rolled steel C710C20D1W, unpolished, primed with 2-coats ED-11 and GPX primers both from PPG Industries, Inc.) were sanded with 400 grit sandpaper and had applied thereto a basecoat which was prepared by mixing one volume of DELTRON® (a basecoat composition available from PPG Industries, Inc.) Basecoat with 1.5 volumes of DRR1170 reactive reducer, commercially available from PPG Industries, Inc., and each basecoated panel dried for at least 30 minutes. Each panel was then separately coated with but one of the clearcoat compositions of Samples 1–5. Two other APR23541 panels were sanded with 400 grit sandpaper and each was then separately coated with one of the coating compositions of Samples 6 and 7.

Dust Times were measured by dropping a cosmetic cottonball from 5 inches above a coated panel, allowing the cosmetic cottonball to lay 10 seconds on said coated panel, then turning the panel over. If cotton ball fell free from the coating, the panel was dust free and the dust time was recorded as the time from the application to the coatings until the time the cotton ball falls free.

Tack Times were measured by a pressing thumb on a coated panel for 2–3 seconds and then releasing thumb. If thumb did not adhere to coating the panel was tack free and tack time was recorded as the time from coating application until the thumb did not adhere.

Gel Times were measured by mixing the listed packages in a container and recording the time elapsed for the liquid to form a solid gel or nonpourable liquid.

TABLE I

| Sample | Dust Time | Tack Time | Gel Time |
| --- | --- | --- | --- |
| 1 | 113 mins | 330 mins | 120 mins |
| 2 | 18 mins | 38 mins | 20 mins |
| 3 | 28 mins | 113 mins | 450 mins |
| 4 | 92 mins | 267 mins | 1395 mins |
| 5 | 25 mins | 75 mins | 900–1260 mins |
| 6 | 44 mins | 200 mins | 600 mins |
| 7 | 15 mins | 64 mins | 385 mins |

As seen by the results of Table I, the hardener or curing composition of the present invention in Samples 3, 5 and 7 provided fast curing as evidenced by the reduced Dust Times and Tack Times while retaining a sufficient gel time for application. Sample 2, on the other hand, while giving short Dust Times and Tack Times, had an exceptionally low gel time which would be impractical in commercial usage.

EXAMPLE II

The use of different metal catalysts in the curing composition of the present invention was illustrated by adding the same to aliquots of 264.3 grams of a coating composition containing the following:

| Component | Weight (grams) |
| --- | --- |
| VM & P Naptha (solvent) | 126.4 |
| Toluene (solvent) | 200.0 |
| Butyl Acetate (solvent) | 173.8 |
| T1890E (polyisocyanate) | 418.0 |
| P25-A460 (aliphatic isocyanate prepolymer) | 666.0 |
| Tinuvin 123 (u.v. light stabilizer) | 14.0 |
| | 1598.2 grams total |

To Aliquot A, 2.4 grams of calcium naphthanate were added; to Aliquot B, 2.4 grams of cesium naphthanate were added; to Aliquot C, 2.4 grams of cobalt naphthanate were added; and to Aliquot D, 0.6 grams of dibutyl tin dilaurate were added.

In Samples 1–4, 200 milliliters of the aliquots A–D were added respectively to 200 milliliters of DCU 2020 and 100 milliliters of DT 870, while in Sample 5, 100 milliliters of Hardener B (Example I) were added.

Five APR23541 panels as described in Example I were sanded with 400 grit sandpaper. A basecoat was then applied, composed of DELTRON 2000 and DT870 reducer, to each panel and the panels dried for at least 30 minutes. Each panel was then coated with but one of the samples of Samples 1–5.

Dust time and tack time of the coatings were determined as in Example I.

TABLE II

| Sample | Dust Time | Tack Time |
| --- | --- | --- |
| 1 | 22 mins | 90 mins |
| 2 | 20 mins | 87 mins |
| 3 | 16 mins | 68 mins |
| 4 | 16 mins | 52 mins |
| 5 | 32 mins | 140 mins |

EXAMPLE III

To three aliquots each of 200 milliliters of DCU 2001 and 100 milliliters of DT 870, there were added varying amounts of Hardener A, namely Aliquot 1 (100ml), Aliquot 2 (200 ml) and Aliquot 3 (400 ml).

Three APR23541 panels, prepared as in Example I, with sanding and basecoat application, had applied thereto as a clearcoat one of the compositions of Aliquots A, B and C. Dust time and tack time were determined as in Example I.

TABLE III

| Aliquot | Dust Time | Tack Time |
| --- | --- | --- |
| 1 | 25 mins | 105 mins |
| 2 | 25 mins | 75 mins |
| 3 | 12 mins | 45 mins |

EXAMPLE IV

Three curing composition (hardener) aliquots were prepared containing variant amounts of dibutyl tin dilaurate. Each aliquot contained 104.5 grams of T1890E; 170.8 grams of P25-A460; 4.0 grams of TINUVIN 123; and 122.9 grams of butyl acetate. To aliquot A there was added 6.3 grams of 10% dibutyl tin dilaurate in butyl acetate, to aliquot B there was added 7.5 grams of 10% dibutyl tin dilaurate in butyl acetate, and to Aliquot C there was added 10.0 grams of dibutyl tin dilaurate. Two hundred milliliters of the three aliquots were each added to 200 milliliters of DCU 2020 and 100 milliliters of DT 870.

Three APR23541 Panels were sanded with 400 grit sandpaper and a sealer coat composed of DP40/DP401 (a sealer available from PPG Industries, Inc.) and DT 870 was then applied to each sanded panel and dried for at least one hour. A basecoat composed of DELTRON 2000 basecoat and DT 870 reducer was then applied to each panel and dried for at least 30 minutes. Each panel was then separately coated with but one of the clearcoat compositions of each of Aliquot A, Aliquot B and Aliquot C.

TABLE IV

| Sample (% dibutyl tin dilaurate) | Dust Time | Tack Time |
| --- | --- | --- |
| Aliquot A (0.6) | 13 mins | 55 mins |
| Aliquot B (0.75) | 12 mins | 54 mins |
| Aliquot C (1.0) | 13 mins | 46 mins |

The present invention thus provides a curing composition for an acrylic polyol coating composition which provides a fast cure while also having a sufficiently long gel time to allow practical application thereof to the coating composition.

What is claimed is:

1. A curing composition for use in curing a coating composition containing an acrylic polyol, the curing composition comprising:
   a) from about 20 to about 70 percent of an aliphatic polyisocyanate free from urethane groups;
   b) from about 20 to about 70 percent of an aliphatic polyisocyanate prepolymer which is the reaction product of a polyisocyanate with a polyol and contains urethane groups;
   c) from about 0.01 to about 5.0 percent of an ultraviolet light stabilizer;
   d) from about 0.25 to about 5.0 percent of a metal catalyst, the percentages of (a) to (d) based on the total weight of resin solids of the curing composition; and
   e) from about 20 to about 70 percent of an organic diluent, the percentage based on the total weight of resin solids and diluent of the curing composition.

2. The curing composition of claim 1 wherein said aliphatic polyisocyanate (a) is a isocyanurate formed from isophorone diisocyanate.

3. The curing composition of claim 1 wherein said metal catalyst is present in an amount of from about 0.5 to about 2.0 percent based on the weight of the solids of the coating composition.

4. The curing composition of claim 1 wherein said metal catalyst as selected from the group consisting of calcium naphthanate, cesium naphthanate, cobalt naphthanate, dibutyl tin naphthanate, dibutyl tin diacetate, dibutyl tin octoate and dibutyl tin dilaurate.

5. The curing composition of claim 1 wherein said metal catalyst is dibutyl tin dilaurate and is present in an amount of from about 0.5 to about 2.0 percent based on the weight of the solids.

6. The curing composition of claim 1 wherein said organic diluent is present in an amount of from about 30 to about 55 percent.

7. A two package coating composition which, when the two packages are combined, forms a fast cure coating, comprising
   a first package comprising an acrylic polyol; and
   a second package comprising a curing composition comprising:
   a) from about 20 to about 70 percent of an aliphatic polyisocyanate free from urethane groups;
   b) from about 20 to about 70 percent of an aliphatic polyisocyanate prepolymer which is the reaction product of a polyisocyanate with a polyol and contains urethane groups;
   c) from about 0.01 to about 5.0 percent of an ultraviolet light stabilizer;
   d) from about 0.25 to about 5.0 percent of a metal catalyst, the percentages of (a) to (d) based on the total weight of resin solids of the curing composition; and
   e) from about 20 to about 70 percent of an organic diluent, the percentage based on the total weight of resin solids and diluent of the curing composition.

8. The two package coating composition of claim 7 wherein said acrylic polyol is formed from about 0.2 to about 30 percent by weight of a hydroxy-containing vinyl monomer and from about 70 to about 99.8 percent by weight of an ethylenically unsaturated copolymerizable material.

9. The two package coating composition of claim 7 wherein said aliphatic poylisocyanate (a) is an isocyanurate formed from isophorone diisocyanate.

10. The two package coating composition of claim 4 wherein said metal catalyst is present in an amount of from about 0.5 to about 2.0 percent based on the weight of the solids of the coating composition.

11. The two package coating composition of claim 7 wherein said metal catalyst as selected from the group consisting of calcium naphthanate, cesium naphthanate, cobalt naphthanate, dibutyl tin naphthanate, dibutyl tin diacetate, dibutyl tin octoate and dibutyl tin dilaurate.

12. The two package coating composition of claim 7 wherein said metal catalyst is dibutyl tin dilaurate and is present in an amount of from about 0.5 to about 2.0 percent based on the weight of the solids.

13. The curing composition of claim 1 wherein the polyol from which the aliphatic polyisocyanate prepolymer is made has molecular weight of 100 to 1000.

14. The curing composition of claim 7 wherein the polyol from which the aliphatic polyisocyanate prepolymer is made has molecular weight of 100 to 1000.

* * * * *

UNITED STATES PATENT AND TRADEMARK OFFICE
CERTIFICATE OF CORRECTION

PATENT NO. : 5,545,824
DATED : August 13, 1996
INVENTOR(S) : Sandra R. Stengel et al.

It is certified that error appears in the above-indentified patent and that said Letters Patent is hereby corrected as shown below:

Column 10, line 25, claim 10, line 1, delete "4" and insert --7--.
Title page, item [57], last line, delete "the" and insert --to--.

Signed and Sealed this

Thirteenth Day of May, 1997

Attest:

BRUCE LEHMAN

Attesting Officer

Commissioner of Patents and Trademarks